(12) United States Patent
Olsson et al.

(10) Patent No.: US 6,912,400 B1
(45) Date of Patent: Jun. 28, 2005

(54) PROCEDURE TO TRANSMIT INFORMATION AT TELEPHONE ANSWERING SERVICE

(75) Inventors: Bo Olsson, Haninge (SE); Mats Olof Winroth, Poing (DE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/622,593

(22) PCT Filed: Feb. 16, 1999

(86) PCT No.: PCT/SE99/00198
§ 371 (c)(1),
(2), (4) Date: Oct. 23, 2000

(87) PCT Pub. No.: WO99/43141
PCT Pub. Date: Aug. 26, 1999

(30) Foreign Application Priority Data

Feb. 19, 1998 (SE) .............................................. 9800483

(51) Int. Cl.[7] .......................... H04Q 7/20; H04M 11/00; H04M 1/64
(52) U.S. Cl. .................... 455/466; 455/413; 379/88.12; 379/88.25
(58) Field of Search ................ 379/67.1, 88.19–88.26, 379/88.12–88.13; 455/466, 412.1–413, 415

(56) References Cited

U.S. PATENT DOCUMENTS 5,390,236 A * 2/1995 Klausner et al. ............ 379/354
5,418,835 A * 5/1995 Frohman et al. ............. 455/413
5,687,216 A * 11/1997 Svensson .................. 455/412.2
5,737,394 A * 4/1998 Anderson et al. ......... 379/88.11
5,742,668 A * 4/1998 Pepe et al. .................. 455/415
5,742,905 A * 4/1998 Pepe et al. .................. 455/461
5,797,094 A * 8/1998 Houde et al. ............. 455/412.2

(Continued)

FOREIGN PATENT DOCUMENTS

| EP | 0 662 763 | 7/1995 |
| EP | 0 739 147 | 10/1996 |
| WO | WO 93/20640 | 10/1993 |

Primary Examiner—Fan Tsang
Assistant Examiner—Joseph T Phan
(74) Attorney, Agent, or Firm—Oblon, Spivak, McClelland, Maier & Neustadt, P.C.

(57) ABSTRACT

A procedure to transmit information at a telephone answering service, especially in mobile telephone systems. The telephone answering service has a voice mailbox for recording of speech, and also transmits a text message to the mobile telephone especially via SMS (short Message Service). The procedure makes possible an improved functionality in the system in so far as the text message is transmitted in parallel to the mobile telephone from which listening to the voice mailbox is performed. The text message usually contains a telephone number which can be connected with applications in the mobile terminal. The procedure makes it possible that telephone numbers or personal messages, manually or automatically, are stored in the mobile answer function and are transmitted to the listening mobile terminal.

10 Claims, 1 Drawing Sheet

U.S. PATENT DOCUMENTS

| | | | | |
|---|---|---|---|---|
| 5,797,103 A | * | 8/1998 | Duda ........................ | 455/567 |
| 5,802,466 A | * | 9/1998 | Gallant et al. ............. | 340/7.55 |
| 5,909,647 A | * | 6/1999 | Hashimoto et al. ...... | 455/412.2 |
| 5,966,652 A | * | 10/1999 | Coad et al. .............. | 455/412.1 |
| 5,966,663 A | * | 10/1999 | Gleason ..................... | 455/466 |
| 6,002,750 A | * | 12/1999 | Ertz ........................ | 379/88.12 |
| 6,014,559 A | * | 1/2000 | Amin ........................ | 455/413 |
| 6,032,039 A | * | 2/2000 | Kaplan ...................... | 455/413 |
| 6,134,432 A | * | 10/2000 | Holmes et al. ............ | 340/7.29 |
| 6,161,007 A | * | 12/2000 | McCutcheon et al. ... | 455/412.2 |
| 6,181,928 B1 | * | 1/2001 | Moon ........................ | 455/415 |
| 6,233,430 B1 | * | 5/2001 | Helferich .................. | 340/7.21 |
| 6,249,765 B1 | * | 6/2001 | Adler et al. ............. | 379/88.03 |
| 6,298,231 B1 | * | 10/2001 | Heinz ........................ | 455/413 |
| 6,301,338 B1 | * | 10/2001 | Makela et al. ........... | 379/88.21 |
| 6,311,057 B1 | * | 10/2001 | Barvesten .................. | 455/415 |
| 6,333,973 B1 | * | 12/2001 | Smith et al. ............. | 379/88.12 |
| 6,366,785 B2 | * | 4/2002 | Saarela et al. ............. | 455/466 |
| 6,368,205 B1 | * | 4/2002 | Frank ........................ | 455/413 |
| 6,389,115 B1 | * | 5/2002 | Swistock .................. | 379/88.12 |
| 6,389,276 B1 | * | 5/2002 | Brilla et al. ................ | 455/413 |
| 6,393,296 B1 | * | 5/2002 | Sabnani et al. ............. | 455/466 |
| 6,408,176 B1 | * | 6/2002 | Urs ........................ | 379/100.08 |
| 6,408,191 B1 | * | 6/2002 | Blanchard et al. .......... | 455/566 |
| 6,418,307 B1 | * | 7/2002 | Amin ........................ | 455/413 |
| 6,507,735 B1 | * | 1/2003 | Baker et al. ................ | 455/412 |
| 6,630,883 B1 | * | 10/2003 | Amin et al. ............... | 340/7.29 |
| 6,636,733 B1 | * | 10/2003 | Helferich ................. | 455/412.2 |
| 6,826,407 B1 | * | 11/2004 | Helferich .................... | 455/466 |

* cited by examiner

PROCEDURE TO TRANSMIT INFORMATION AT TELEPHONE ANSWERING SERVICE

FIELD OF THE INVENTION

The present invention relates to a procedure to transmit information at a telephone answering service, especially in mobile telephone systems. The telephone answering service, her called mobile answer, has a voice mailbox for recording of speech and also possibility to transmit text messages to the mobile telephone, especially via SMS (Short Message Service). The invention makes possible an improved functionality in the system in so far as the text message is transmitted in parallel to the mobile telephone from which listening to the voice mailbox is made. The text message usually contains a telephone number which can be connected with applications in the mobile terminal. The invention makes possible that telephone numbers, or personal messages, manually or automatically, are stored in the mobile answering function and are transmitted to the mobile terminal listened to.

Prior art

Within this technical field there are different systems and solutions for mobile answering. It is, for instance, known that a calling party himself/herself has possibility to, by means of keyset on his/her telephone, enter the information. Such information can be transmitted via paging systems to the called part. The following document can be regarded as representative for the prior art:

EP,A2 662 763
WO,A1, 95/12 948
WO,A2, 97/31 498
WO,A1, 97/01 252
WO,A1, 96/09 714
EP,A2, 783 219
WO,A1, 93/20 640

In the mobile answer of today, a user is routed to a mobile answer if the mobile subscriber is not accessible. There the A-subscriber will be met by a speech message, either the default voice, or one of two possible speech messages which the mobile subscriber has spoken for recording. In this state, the calling subscriber can speak a voice message to be recorded, which then can be listened to by the mobile subscriber. Mobile answer transmits a notification, via SMS to the mobile answer subscriber, which can contain A-number presentation of the calling subscribers. The mobile answer subscriber then can call the "dialled" numbers by opening the SMS-notification.

The problem is that one does not necessarily know to whom the telephone numbers belong, before one has listened to voice messages in mobile answer. The system is not quite easy to use. Further, the subscriber who is calling mobile answer can have information which is more suitable as text. For instance, a leader of a business who is calling may want to introduce himself/herself and give telefax and e-mailaddress, or a common subscriber may want to give another number than the A-number.

Therefore it would be an advantage to:

1. Have possibility to get A-number in connection with ones listening to the messages in audio response.
2. Have possibility to connect the telephone number to the mobile answer subscriber's own telephone list on the SIM-card.
3. Have possibility to packet the function, making it simple and intuitive to use.
4. Have the calling subscriber to give more information to mobile answer than just a voice message.

The present invention solves these problems by mobile answer storing information and transmitting this to the called subscriber only when he/she listens to his/her voice message. The information is transmitted in parallel, for instance through SMS, and can be connected to applications in the called subscriber's mobile terminal, or on the SIM-card, for presentation and use. By that, the called subscriber will have the information presented at right time and in a way which is easy to understand and use.

SUMMARY OF THE INVENTION

Consequently the present invention provides a procedure to transmit information in connection with telephone answering service which is provided by a mobile answer device in a mobile telephone system.

According to the invention the calling subscriber is connected to the mobile answer device when the called subscriber cannot be accessed. The mobile answer device stores information which originates from the called subscriber. When the called subscriber establishes a connection to the mobile answer device, to listen to recorded voice messages, a message is transmitted in parallel to the called subscriber. This message contains the stored information.

The stored information can, for instance, contain the called subscriber's number, one in advance stored message from the calling subscriber, or an optional number entered by the calling subscriber.

The invention is defined in enclosed patent claim 1, whereas advantageous embodiments of the invention are given in the subclaims.

BRIEF DESCRIPTION OF THE DRAWING

The invention now will be described in detail with reference to enclosed drawing, the only FIGURE of which is a diagrammatic illustration of the system according to the invention.

DETAILED DESCRIPTION OF PREFERRED EMBODIMENTS

Figure 1:
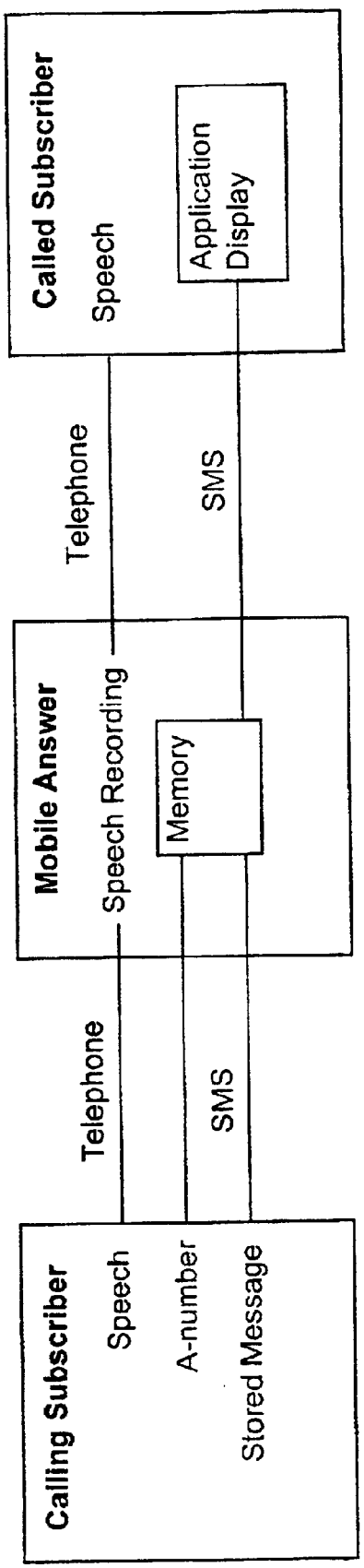

In the FIGURE is shown diagrammatically a system which can realise the procedure according to the present invention. In the mobile telephone systems of today there are functions to record messages when a called subscriber cannot be accessed. The called subscriber can, for instance, have switched off the telephone, or be outside the coverage area of the system, or quite simply be busy in another call. A calling subscriber is then connected to a voice mailbox system, or the like, here called mobile answer. The calling subscriber can call from another mobile terminal, or an ordinary telephone in the fixed network. Certain functions according to the invention, however, implies a special functionality also in the calling subscriber's telephone, as is explained in more details below.

The mobile terminals of today often have an advanced functionality which can be stored on an active card, the so called SIM-card (Subscriber Identity Module). With WAP (Wireless Application Protocol) SIM Toolkit and JAVA in the mobile terminal, new possibilities are opened to create advanced services with good user interface.

The three first problems deal with presenting calling subscribers A-numbers to the mobile answer subscriber who calls mobile answer.

1. The A-numbers are transmitted, not as previously at notification, but at the listening to the messages. This is done via SMS or USSD (Unstructured Supplementary Services Data) which uses signalling channels which transfer information in parallel with the speech service. The information is packeted to an application in the mobile terminal, which has access to telephone list and can present the information on the terminal's display. It is possible via SIM Toolkit or WAP.

2. The application connects the A-numbers to the telephone list in the mobile. I.e. if the one who is calling is in the telephone list, the name is shown instead of the telephone number. If the number is not in the list, the number is shown as it is.

3. Via WAP or SIM Toolkit the information is shown, i.e. the names or telephone numbers of the different subscribers, automatically on the display as a menu (see example below).
"Call Kalle 08 689 5510 (this number does not exist in the telephone list)

Sven Stålnacke

By selecting one of the menu options, and press the "call"-button, the call is established and the connection to mobile answer is disconnected. Menu selection can be made via a "cursor", or via selection of digits.

4. The fourth point deals with that the subscriber which ends up in mobile answer instead of only speaking a message for recording, is given the possibility to write further information via WAP, SIM Toolkit, or keyset code DTMF (Dual Tone Multi-Frequency). By using DTMF, information can be transferred also from an ordinary telephone.

DTMF: In order to use DTMF is required that an option is given by mobile answer. "Hallo, this is Lars Nilssons mobile answer box and I cannot answer just now. Please, speak a message for recording after the tone, and/or press "1" if you want to give a telephone number. At selection of "1" there comes: "Please, "dial" the number and finish by square(#)". The calling party consequently can speak a message for recording and then give a telephone number; thus not necessarily A-number, which often can be useful if one, for instance, is calling from a public call box, or from a PABX (Public Automatic Branch Exchange), where A-number is not presented.

WAP or SIM Toolkit: When the call is routed to mobile answer, the mobile answer immediately transmits a message to the calling subscriber's mobile terminal. If the mobile has the application, which can be located on the SIM-card or the in terminal, the mobile transmits one in advance stored personal message to mobile answer. The message can be stored in the terminal, or on the SIM-card, and can consist of telephone number and various text information. The mobile answer subscriber receives the message at the same time, at the listening to the mobile answer.

Consequently the present invention i.a. gives the following advantages:

The telephone number from calling subscriber is transmitted to the voice mailbox subscriber via SMS or USSD, at the same time as the subscriber listens to recorded mobile answer messages. This can be performed by means of SIM Toolkit, or WAP-application, which is located in mobile answer and the mobile answer subscriber's terminal.

The subscriber who is calling and ends up in mobile answer is given possibility to transmit an own telephone number, or a personal message, while he/she is speaking a speech message for recording in mobile answer. This can be performed via DTMF or (SIM Toolkit or WAP)-application on the SIM-card, or in the terminal.

The solution is not limited to GSM, but can, if it is implemented via WAP, be used directly by all mobile standards which will be WAP-compatible.

The invention can be used, together with speech messages from mobile answer, also to transfer telephone numbers, or other information, from calling subscribers. The invention can be used to differentiate the service offer between different operators, and might be located on the SIM-card.

In present implementations of voice mailbox, information from calling subscriber only consists of recorded voice messages together with A-number in the mobile answer notification.

By the invention, the mobile answer subscriber can get the calling subscribers' numbers directly in connection with that the speech messages are listened to.

Get the information presented with the name of the calling subscriber, via telephone book in terminal.

The subscriber who ends up in mobile answer can give further telephone numbers or information.

An expert in the field realises that the invention can be implemented in different ways with different combinations of software and hardware. The extent of protection of the invention is only limited by the patent claims below.

What is claimed is:

1. A procedure to transmit information in connection with a telephone answering service which is provided by a remote answer device in a mobile telephone system comprising:

connecting a calling subscriber to the remote answer device when a called subscriber can not be accessed;

storing information that originates from the calling subscriber on the remote answer device; and transmitting a text message containing the stored information, in parallel to transmitting recorded speech messages from the calling subscriber, to the called subscriber when the called subscriber establishes a wireless connection to the remote answer device to listen to recorded speech messages.

2. The procedure as claimed in claim 1, wherein the stored information includes the calling subscriber's number, which is transferred automatically to the remote answer device.

3. The procedure as claimed in claim 1, wherein the stored information includes one message stored in advance at the calling subscriber, which is transferred automatically to the remote answer device.

4. The procedure as claimed in claim 1, wherein the stored information contains an optional number, which is transferred by the calling subscriber to the remote answer device.

5. The procedure as claimed in claim 1, wherein the text message is connected to an application at the called subscriber's mobile terminal.

6. The procedure as claimed in claim 5, wherein the application connects a number with a telephone list.

7. The procedure as claimed in claim 1, wherein the text message is transmitted by a short text message service.

8. The procedure as claimed in claim 7, wherein the short text message service is an SMS (Short Message Service) or a USSD (Unrestricted Supplementary Services Data).

9. A method of transmitting information between a calling subscriber and a called subscriber in a mobile telephone system, comprising:

connecting a calling subscriber to a remote answer device when a called subscriber cannot be reached;

storing information that originates from the calling subscriber on the remote answer device; and transmitting a text messages containing the stored information, in parallel to transmitting recorded speech messages from the calling subscriber, to the called subscriber when the called subscriber establishes a wireless connection to the remote answer device to listen to recorded speech messages.

10. The method as in claim 9, further comprising:
transmitting the text message as a SMS (Short Message Service) or as a USSD (Unrestricted Supplementary Services Data).

* * * * *